United States Patent [19]

Heuer et al.

[11] Patent Number: 4,797,697
[45] Date of Patent: Jan. 10, 1989

[54] MINIATURE 110 CAMERA WITH FOUR-PANEL WRAPPER

[75] Inventors: William H. Heuer, Arlington Heights; Hari Matsuda, Evanston, both of Ill.

[73] Assignee: W. Haking Enterprises Limited, Hong Kong, Hong Kong

[21] Appl. No.: 96,618

[22] Filed: Sep. 14, 1987

[51] Int. Cl.$^4$ .................... G03B 13/04; G03B 17/02
[52] U.S. Cl. ........................... 354/75; 354/219; 354/288
[58] Field of Search .............. 354/75, 219, 288

[56] References Cited

U.S. PATENT DOCUMENTS

| | | | |
|---|---|---|---|
| 2,083,670 | 6/1937 | Schubert | 354/219 X |
| 2,612,092 | 9/1952 | Heyer et al. | 354/288 X |
| 3,731,586 | 5/1973 | Meazza | 354/219 X |
| 4,690,534 | 9/1987 | Chen-Liang | 354/288 X |

Primary Examiner—Michael L. Gellner
Attorney, Agent, or Firm—Wallenstein, Wagner, Hattis & Strampel, Ltd.

[57] ABSTRACT

A camera has a housing with a multi-panel wrapper adhesively secured thereto. The wrapper is printed on its outer face with markings, indicia or decorations desired. The wrapper has front, top, bottom and side panels arranged to be applied to like walls of the housing. Joint portions and tabs extend from the panels to cover bevels occurring at the margins of the housing walls. The camera has a side mounted viewfinder and a notch in the side panel to facilitate application of the wrapper on the housing. The wrapper is made from an integral sheet of plastic material cut to the dimensions of the housing walls.

23 Claims, 1 Drawing Sheet

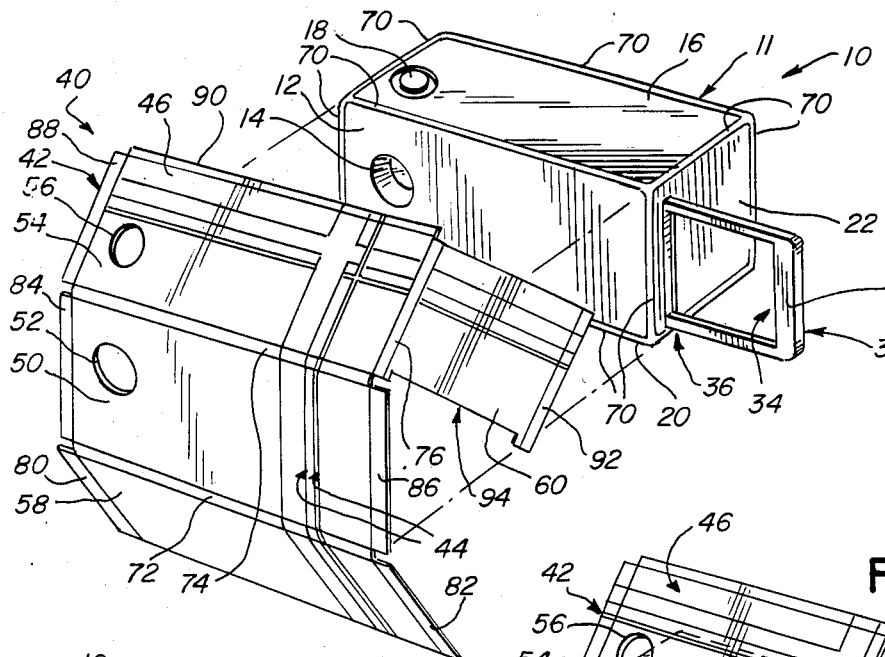
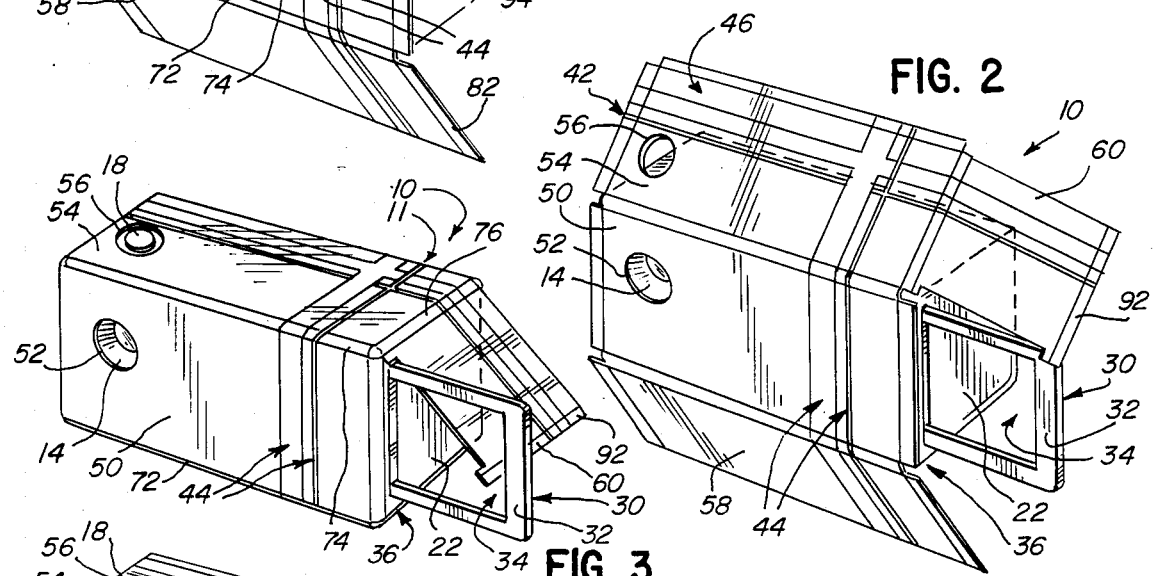
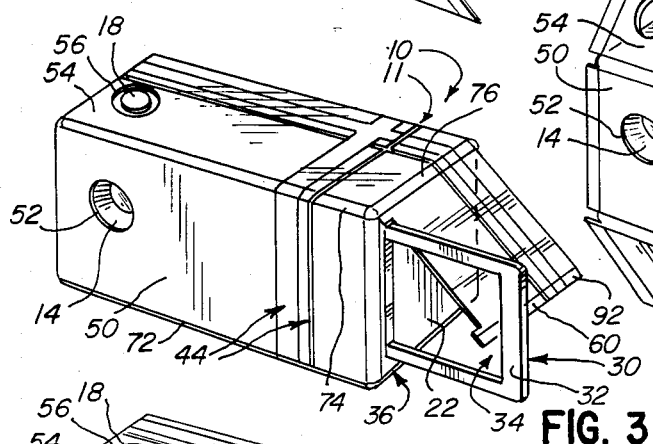
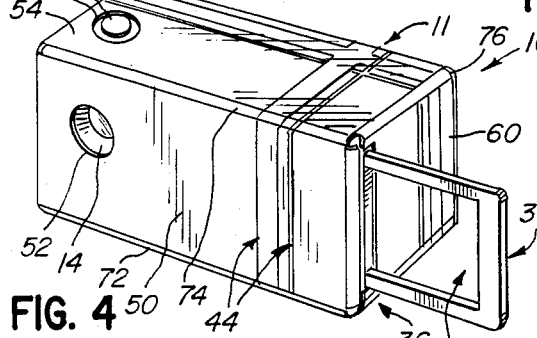
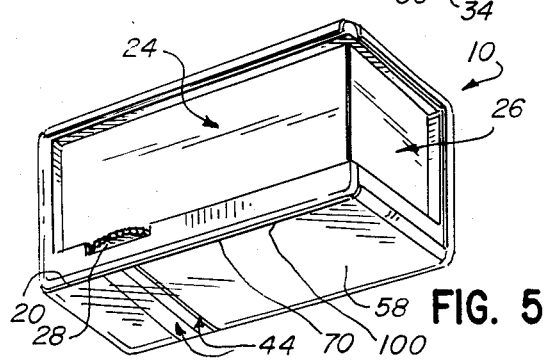
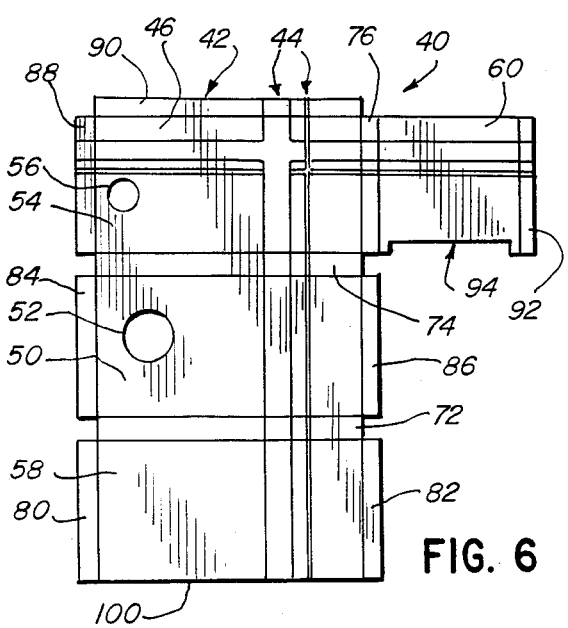

MINIATURE 110 CAMERA WITH FOUR-PANEL WRAPPER

CROSS REFERENCE TO RELATED APPLICATION

This application relates to U.S. design patent application Ser. No. 096,837, filed concurrently herewith in the name of William H. Heuer and Hari Matsuda, assigned to Ansco Photo-Optical, and titled Miniagure 110 Camera With Side Viewfinder.

BACKGROUND OF THE INVENTION

This application relates generally to hand held cameras and particularly relates to a unique camera and wrapper combination which permits the camera manufacturer to provide uniquely appearing cameras for each particular customer desiring such a unique appearance.

Hand held cameras that take pictures with 110 film carried in a standard two-lobe cartridge are frequently sold at nominal prices and are given away as premium items. In the latter case, the giver sometimes desires indicia on the camera itself which identifies the company involved. Also, it is often desirable for a camera manufacturer making a basic camera for sale to different customers, who sell it under their own trademarks, to vary the appearance of the cameras somewhat so that each customer's camera has a unique appearance. This can be very costly.

Some of these premium-type miniature 110 cameras have a fold-up viewfinder providing a rectangular frame through which the user looks from the back of the camera to place the desired subject within the frame of the film contained in the camera. This viewfinder is pivotally mounted on the camera so that in its operative position, it extends substantially parallel to the plane of the front wall and when not in use, folds flat against the camera. In either operative or stored position, the viewfinder would present an obstacle or obstruction to the addition of a wrapper unique to the present invention which would give the camera a unique appearance.

SUMMARY OF THE INVENTION

A camera of the invention furnishes desired distinctive markings, indicia or decoration to the camera housing by securing a multi-paneled wrapper on the outer surfaces of the camera. The wrapper becomes printed separate from the manufacture of the camera and cut to dimensional configurations corresponding to those of the camera. The wrapper then becomes applied to the camera housing to customize the camera for any desired customer as a final manufacturing step. This eliminates multicamera inventory for different customers and effects the application of markings, indicia or decoration less expensively than by direct printing on the cameras.

The camera of the preferred embodiment of the invention uniquely places the viewfinder on a side wall rather than on the top wall. This facilitates application of the label to the camera and the appearance of the finished camera assembly after the application of the label.

In the preferred embodiment of the invention, a miniature 110 camera has a rectangular front wall carrying a lens aperture therethrough, rectangular top and bottom walls arranged above and below one another with the top wall carrying a shutter button for tripping the shutter behind the lens, and a side wall extending from the front wall and between the top and bottom walls. The miniature 110 camera generally presents an open back and an open right side for receiving and retaining therein a standard 110 film cartridge in operative position which closes off the open back and side of the camera housing. The camera further has a folding viewfinder in the form of a rectangular frame pivotally mounted to the side wall at or adjacent the juncture of the side wall to the front wall. The viewfinder folds against the camera when not in use and pivots to be substantially parallel to the front wall when in use.

The unique wrapper of the invention has a front panel, bottom panel and top panel connected together and a side panel extending from one edge of the top panel. The front panel contains an opening aligned with the lens aperture to provide a clear field of view for the lens, and the top panel has an opening aligned with the shutter button for free access by the user to the shutter button.

The wrapper is integrally formed from a sheet of synthetic plastic material. The inner surface carries an adhesive substance for securing the label to the outer surfaces of the camera walls and the outer surface thereof carries printed markings, indicia or decorations of any one of several different types as may be desired by different customers. The label is applied to the camera by placing the front panel on the front wall, folding the bottom and top panels on the respective bottom and top walls and finally folding the side panel on the side wall while the viewfinder is pivoted to operative position. The viewfinder then is folded back against the camera, and the camera can be packaged for delivery to the customer.

Typically, a miniature 110 camera provides bevels at the margins of the walls and the wrapper provides joints portions between the panels and tabs extending from edges of the panels to cover such bevels. Additionally, a side panel can present an elongated notch aligned to accommodate the portion of the viewfinder extending from the side wall.

BRIEF DESCRIPTION OF THE DRAWINGS

FIG. 1 is an exploded perspective view of a miniature 110 camera of the invention with the four-panel wrapper spaced therefrom;

FIG. 2 is a perspective view of the camera of the invention with the front panel of the wrapper applied to the front wall of the camera;

FIG. 3 is a perspective view of the camera of the invention with the bottom, front and top panels of the wrapper applied to the camera;

FIG. 4 is a perspective view of the camera of the invention with the wrapper fully applied thereto;

FIG. 5 is a perspective view from below and behind the camera of the invention; and FIG. 6 is a plan view of the wrapper.

DESCRIPTION OF THE PREFERRED EMBODIMENT

Referring to all of the drawing figures, camera 10 furnishes a generally rectangular front wall 12 having a lens aperture 14 therein. A generally rectangular top wall 16 extends rearwardly from the top of the front wall 12 and carries a shutter button 18 for tripping a shutter behind the lens aperture. A substantially rectangular bottom wall 20 extends rearwardly under the top wall 16 from the bottom of the front wall 12 and a side wall 22 extends from the side of the front wall, top wall 16 and bottom wall 20.

In FIG. 5, the back 24 and right side 26 are open as may be desired to accept the standard 110 film cartridge in operative position. A thumb wheel 28 becomes operated by the user to advance the film in the cartridge. Back 24 and side 26 are shown in blank rectangular configuration to indicate that any desired structure can be located thereat. They do not form a part of the invention.

A viewfinder 30 furnishes a rectangular frame 32 with an aperture 34 therethrough. The viewfinder 30 includes a pivotal mounting structure 36 providing for the viewfinder to be folded flat against the side wall 22 in a stored position when it is not being used and to be pivotally rotated to be substantially parallel with front wall 12 in an operative position, as shown.

A sheet of material 40 furnishes a wrapper 42 carrying indicia 44 in the form of a pair of lines printed thereon. The wrapper is integrally formed from the sheet of material 40 such as plastic to present an outer face 46 and an inner face (not shown). The inner face carries an adhesive substance for securing the wrapper to the camera housing while the outer face 46 is printed with the indicia 44. The indicia can be any one of several different types desired for different customer desires and can be applied to wrapper 42 by any printing or other process desired.

Wrapper 42 furnishes a substantially rectangular front panel 50 having an opening 52 therethrough aligned with the lens aperture to provide clear view for the lens. A top panel 54 furnishes a passage 56 aligned with the shutter button 18 for free access to the shutter button. A bottom panel 58 extends from the bottom of the front wall 50 and a side panel 60 extends from a side of the top panel 54. The indicia 44 extend across the four panels, and although shown as a pair of straight lines, the indicia 44 can be any text or graphic material desired.

Referring to FIG. 2, front panel 50 of wrapper 42 has become secured to the outer surface of front wall 12. Bottom panel 58, top panel 54 and side panel 60 remain spaced therefrom.

In FIG. 3, the bottom panel 58 and top panel 54 become secured to the respective bottom and top walls of the camera housing 11 by bending the bottom and top panels onto the respective bottom and top walls of the housing 11. Side panel 60 remains spaced from side wall 22.

In FIG. 4, side panel 60 becomes secured against the outer surface of side wall 22 by bending it downwardly thereagainst. Viewfinder 30 remains in its extended operative position while side panel 60 becomes secured to side wall 22 to avoid interference between the side panel and viewfinder. After the side panel has become secured to the side wall, the viewfinder can be pivoted to its storage position against the side wall 22 without interference by the side panel 60.

Referring again to all of the drawing figures, the walls of the camera housing 11 have marginal portions 70 that are bevelled smoothly to merge into adjacent walls. This presents an aesthetically pleasing housing 11 and one that must be conformed to by wrapper 42. Accordingly, wrapper 42 presents a first joint portion 72 extending between and joining front panel 50 to bottom panel 58, a second joint portion 74 extends between front panel 50 and top panel 54 and a third joint 76 extends between the top panel 54 and the side panel 60. When the wrapper 42 becomes secured to the camera housing 11, these first, second and third joint portions 72, 74 and 76 overlay the bevels 70 between the bottom wall, front wall, top wall and side wall.

Further to cover the bevels of housing 11, wrapper 42 provides a pair of bottom tabs 80, 82 extending from opposite sides of bottom panel 58. A pair of front tabs 84 and 86 extend from the opposite sides of front panel 50. A pair of top tabs 88 and 90 extend from adjacent edges of top panel 54 and a side tab 92 extends from the free end of side panel 60. With wrapper 42 secured on the camera housing 11, these tabs substantially cover the bevels 70 at the margins of the walls to furnish a smooth and aesthetically pleasing appearance.

Side wall 60 further includes a marginal notch 94 aligned to accommodate the viewfinder 30. Viewfinder 30 and mounting means 36 extend through this notch 94.

Referring specifically to FIGS. 5 and 6, the free edge 100 of bottom panel 58 ends upon the flat surface of the bottom wall 20. There is no tab that extends around the bevel 70 thereat. The reason for the absence of a tab at this location is to at least avoid interference with the thumb wheel 28. Ending the bottom panel 58 short of the bevel 70 also reduces the ability of a user to peel the bottom panel away from the camera housing during normal usage.

Variations of the invention and of the preferred embodiment can be made while staying within the scope of the appended claims. For example, the wrapper could have fewer panels to cover such as only the front wall and top wall of the camera housing or could have additional panels to cover the walls of a camera that completely encloses the film therein. Further, the printed indicia, markings or decorations can extend across only two or more of the panels as may be desired. Additionally, the indicia on the separate panels can be separate from one another and not continuously extending across the panels, joints and tabs. The side location of the viewfinder facilitates easy wrapping of the label upon the camera housing but other locations of the viewfinder remain possible.

We claim:

1. A photographic camera adapted to carry a selected one of several different appearance-distinguishing indicia, comprising:

A. a housing having outer walls including at least a front wall that includes a lens aperture, a top wall extending rearwardly from the top of said front wall and a shutter button on said housing for tripping a shutter behind said lens aperture, said housing also including a viewfinder and mounting means for pivotally mounting said viewfinder on said housing for rotation between positions substantially lying against one of said walls and extending substantially parallel to said front wall; and B. a wrapper integrally formed of a sheet of material having inner and outer faces, the interior face of said sheet carrying an adhesive substance securing said wrapper to said housing by bonding thereto and the outer face of said sheet being provided with said selected appearance-distinguishing indicia, said wrapper including at least a front panel and a top panel both including said selected indicia, the respective panels conforming to the respective dimensions of said walls of said housing and being secured thereto by said adhesive, said front panel having an opening therethrough aligned with said lens aperture to provide clear view for said lens aperture.

2. The camera of claim 1 in which said wrapper furnishes panels that become secured to all of the walls of said housing and all of said panels carry said selected indicia.

3. A photographic camera adapted to carry a selected one of several different appearance-distinguishing indicia, comprising:
   A. a housing having a rectangular front wall that includes a lens aperture, a rectangular top wall extending from the top of said front wall and carrying a shutter button for tripping a shutter behind said lens aperture, a rectangular bottom wall extending rearwardly from the bottom of said front wall, and at least one side wall extending between the sides of said front, top and bottom walls, said housing also including a viewfinder and mounting means for pivotally mounting said viewfinder on said housing for rotation between positions substantially lying against one of said walls and extending substantially parallel to said front wall; and
   B. a wrapper integrally formed of a sheet of material and presenting inner and outer faces, said inner face carrying an adhesive substance securing said wrapper to said housing by bonding thereto and said outer face being provided with said selected appearance-distinguishing indicia, said wrapper including a front panel, a bottom panel, a top panel and a side panel all carrying said selected indicia, the respective panels conforming to the respective dimensions of said front wall, bottom wall, top wall and side wall and being secured thereto by said adhesive, said front panel having an opening therethrough aligned with said lens aperture to provide clear view for said lens aperture, and said top panel having a passage therethrough aligned with said shutter button for free access to said shutter button.

4. The camera of claim 3 in which said housing has no rear wall and only one side wall, the top of said front panel is joined to said top panel, the bottom of said front panel is joined to said bottom panel, and a side of said top panel is joined to said side panel.

5. The camera of claim 3 in which said mounting means are arranged on sai dside wall and said side panel includes a marginal notch aligned with said mounting means for applying said side panel to said side wall clear of said mounting means and said viewfinder.

6. The camera of claims 1 or 3 in which said mounting means are located on said side wall adjacent said front wall so that said viewfinder can lie substantially against said side wall.

7. The camera of claims 1 or 3 in which the margins of each of said walls of said housing include bevels that merge smoothly into the bevels of adjacent walls and in which said wrapper includes at least one joint portion of sheet material extending between said panels arranged to be applied to said bevels when said panels become applied to said walls.

8. The camera of claim 7 in which said panels include tabs of sheet material extending from the margins thereof to be applied to said bevels when said panels become applied to said walls.

9. The camera of claim 8 in which said front panel includes a pair of said tabs on opposite sides thereof.

10. The camera of claim 8 in which said top panel includes a pair of said tabs on adjacent sides thereof.

11. The camera of claims 1 or 3 in which the margins of said walls are bevelled to merge smoothly into the bevels of adjacent walls, said panels carry tabs arranged to be applied to said bevels when said panels are applied to said walls and the bottom edge of said bottom panel is free of any tab to avoid peeling the wrapper from the bottom wall.

12. The camera of claims 1 or 3 in which said panels include a marginal notch aligned with said mounting means for applying said panels to said walls clear of said mounting means and viewfinder and through which said viewfinder extends.

13. The camera of claims 1 or 3 wherein said camera is of the miniature 110 variety for use with a standard 110 cartridge, said housing has a rectangular front wall, a rectangular top wall, a rectangular bottom wall, a side wall extending from the sides of said front, top, and bottom walls, an open back and an open side opposite said side wall for receiving and retaining in operative position said standard cartridge of 110 film, said viewfinder being pivotally mounted by said mounting means at the juncture of said front wall and said side wall for movement of said viewfinder between positions substantially lying against said side wall and extending generally parallel to said front wall, said wrapper including a notch in said side panel through which said viewfinder extends.

14. The camera of claims 1 or 3 wherein said wrapper is configured to leave at least one of the sides of said housing exposed so as to form only a partial enclosure around said camera.

15. The camera of claim 14 wherein at least one side of said housing is an open side.

16. The camera of claims 1 or 3 wherein said wrapper is configured to leave at least two adjacent sides of said housing exposed so as to form only a partial enclosure around said camera.

17. The camera of claim 16 wherein said adjacent housing sides are open sides.

18. A hand held miniature 110 camera for manually taking photographs with 110 photographic film carried in a standard cartridge, said camera being adapted to carry a selected one of several different types of indicia desired, said camera comprising:
   A. a housing intended to be hand held by a user, said housing including a rectangular front wall that has a lens aperture therein, a rectangular top wall extending rearwardly from the top of said front wall and carrying a shutter button for tripping a shutter behind said lens aperture, a rectangular bottom wall extending rearwardly from the bottom of said front wall, and one side wall extending between the sides of said front, top and bottom walls, said housing having an open back and side opposite said side wall for receiving and retaining in operative position said standard cartridge of 110 film, said housing also including a viewfinder having a rectangular frame and mounting means at one side of said frame for pivotally mounting said view finder on said camera at the juncture of said front wall and said side wall for movement of said viewfinder between positions substantially lying against said side wall and extending substantially parallel to said front wall, each housing wall having four side margins and the margins of each wall being bevelled with the bevels of adjacent walls merging smoothly into the margins of one another; and B. a wrapper integrally formed of a sheet of material having inner and outer faces, the inner face carrying an adhesive substance for securing said wrapper to said housing and the outer face being printed with said selected indicia of any one of said several different types, said wrapper presenting a front panel, a bottom panel, a top panel and a side panel, the respective panels conforming to the respective dimensions of said front wall, bottom wall, top wall and side wall and being secured thereto by said adhesive, said front panel having an opening therethrough aligned with said lens to provide clear view for said lens, and said top panel having a passage therethrough aligned with said shutter button for free access to said shutter button, said wrapper also including a notch in said side panel through which said viewfinder extends.

19. The camera of claim 18 in which said wrapper includes a first joint portion between said bottom panel and said front panel overlying and being secured to the bevelled margins between said bottom and front walls, said wrapper including a second joint portion between said front panel and said top panel overlying and being secured to the bevelled margins between said front and top walls, said wrapper also including a third joint portion between said top panel and said side panel overlying and being secured to the bevelled margins between said top and side walls.

20. The camera of claim 18 in which said wrapper also includes a pair of bottom tabs extending from opposite ends of said bottom panel, a pair of front tabs extending from opposite ends of said front panel, a pair of top tabs extending from adjacent ends of said top panel, and a side tab extending from the terminal end of said side panel, said tabs overlying and being secured to said bevelled margins of said walls.

21. A hand held miniature 110 camera for manually taking photographs with 110 photographic film carried in a standard cartridge, said camera being adapted to carry a selected one of several different appearance-distinguishing indicia desired, said camera comprising:
A. a housing intended to be hand held by a user, said housing including a rectangular front wall that has a lens aperture therein, a rectangular top wall extending rearwardly from the top of said front wall and carrying a shutter button for tripping a shutter behind said lens aperture, a rectangular bottom wall extending rearwardly from the bottom of said front wall, and one side wall extending between the sides of said front, top and bottom walls, said housing having an open back and side opposite said side wall for receiving and retaining in operative position said standard cartridge of 110 film, said housing also including a viewfinder having a rectangular frame and mounting means at one side of said frame for pivotally mounting said view finder on said camera at the juncture of said front wall and said side wall for movement of said viewfinder between positions substantially lying against said side wall and extending substantially parallel to said front wall, each housing wall having four side margins; and
B. a wrapper integrally formed of a sheet of material having inner and outer faces, the inner face carrying an adhesive substance for securing said wrapper to said housing and the outer face being printed with said selected indicia of any one of said several different appearance-distinguishing indicia, said wrapper presenting a front panel, a bottom panel, a top panel and a side panel, the respective panels conforming to the respective dimensions of said front wall, bottom wall, top wall and side wall and being secured thereto by said adhesive, said front panel having an opening therethrough aligned with said lens to provide clear view for said lens, and said top panel having a passage therethrough aligned with said shutter button for free access to said shutter button, said wrapper also including a notch in said side panel through which said viewfinder extends.

22. The camera of claim 21 in which said wrapper includes a first joint portion between said bottom panel and said front panel overlying and being secured to the margins between said bottom and front walls, said wrapper including a second joint portion between said front panel and said top panel overlying and being secured to the margins between said front and top walls, said wrapper also including a third joint portion between said top panel and said side panel overlying and being secured to the margins between said top and side walls.

23. The camera of claim 21 in which said wrapper also includes a pair of bottom tabs extending from opposite ends of said bottom panel, a pair of front tabs extending from opposite ends of said front panel, a pair of top tabs extending from adjacent ends of said top panel, and a side tab extending from the terminal end of said side panel, said tabs overlying and being secured to said margins of said walls.

* * * * *